United States Patent [19]

Spiesberger

[11] Patent Number: 4,995,011
[45] Date of Patent: Feb. 19, 1991

[54] ACOUSTIC MAPPING SYSTEM USING TOMOGRAPHIC RECONSTRUCTION

[75] Inventor: John L. Spiesberger, North Falmouth, Mass.

[73] Assignee: Woods Hole Oceanographic Institute, Woods Hole, Mass.

[21] Appl. No.: 409,924

[22] Filed: Sep. 20, 1989

[51] Int. Cl.[5] .............................................. G01S 15/00
[52] U.S. Cl. ................................... 367/127; 367/124; 367/902
[58] Field of Search .................. 367/6, 124, 125, 127, 367/129, 907, 902, 13; 73/1 DV, 572, 170 A, 170 R, 861.18, 861.27, 861.28, 861.29

[56] References Cited

PUBLICATIONS

Watkins and Schevill, "Four Hydrophone Array for Acoustic Three-Dimensional Location", Woods Hole Oceanographic Institution Technical Report 71-60, 1971.

B. D. Cornuelle, "Simulations of Acoustic Tomography Array Performance with Untracked or Drifting Sources and Receivers", J. Geo. Res. 90 (C5), pp. 9079-9088, 1985.

Primary Examiner—Thomas H. Tarcza
Assistant Examiner—Daniel T. Pihulic
Attorney, Agent, or Firm—Norman E. Brunell

[57] ABSTRACT

A technique for the non-intrusive position determination of one or more natural or artificial acoustic transmitters (S1, S2, S3) in marine or terrestrial environments by processing data from five or more receivers (R1, R2, R3, R4, R5) distributed in the area. The data processing includes cross correlation (24) of receiver data to determine differences in acoustic data travel times (MTTD) and tomographic reconstruction (16) to determine transmitter position as well as receiver position (42), wind or current (40) and sound speed or temperature fields (44) and errors (41) associated with all of the above. Accuracy can be greatly enhanced by use of calibration transmissions at receiver or other known or unknown position locations. Position and wind, sound speed and error fields may conveniently be displayed by computer generated maps (18, 20, 22, 43).

28 Claims, 2 Drawing Sheets

ACOUSTIC MAPPING SYSTEM USING TOMOGRAPHIC RECONSTRUCTION

BACKGROUND OF THE INVENTION

1. Field of the Invention.

The present invention relates to acoustic techniques for determining mapping data, such as topographic survey data, source and/or receiver position as well as wind or current and sound speed or temperature fields, from an environment. The present invention is particularly related to such techniques which utilize tomographic reconstruction to reduce ambiguities.

2. Description of the Prior Art.

The use of acoustic techniques to localize natural sounds when the transmission times are not known is discussed by Watkins and Schevill in "Four hydrophone array for acoustic three-dimensional location", Woods Hole Oceanographic Institution Technical Report 71-60, 1971.

The use of tomographic techniques to localize artificial transmitters with known transmission times and nearly known positions is discussed by B. D. Cornuelle in "Simulations of acoustic tomography array performance with untracked or drifting sources and receivers", J. Geo. Res. 90 (C5), pp. 9079-9088, 1985.

Such conventional techniques do not provide method or apparatus for accurately mapping acoustic source positions, improving estimates of receiver positions and mapping wind current and sound speed fields when the transmission times

SUMMARY OF THE INVENTION

The preceding and other shortcomings of the prior art are addressed and overcome by the present invention that provides, in a first aspect, a method for determining mapping information from acoustic data acquired in the environment to be mapped by determining travel time differences between receivers for the acoustic data and providing estimates of error sources in the environment to a model thereof together with the determined travel time differences to a model of the environment to be mapped.

In a further aspect of the invention, the travel time differences are determined by cross correlation of the acoustic data from pairs of receivers.

In another aspect, the invention applies reference estimates to the model to localize approximate source positions, determines reference; travel time differences based upon the reference estimates, determines differential travel time differences based on the difference between the reference travel time differences and the measured travel time differences and uses the differential travel time differences to extract the desired mapping information.

In a further aspect, the invention provides maps of the reliability (or its inverse, the error) of the mapped source position, receiver positions, wind, current, and sound speed fields.

DETAILED DESCRIPTION OF THE PREFERRED EMBODIMENT

Figure 1:
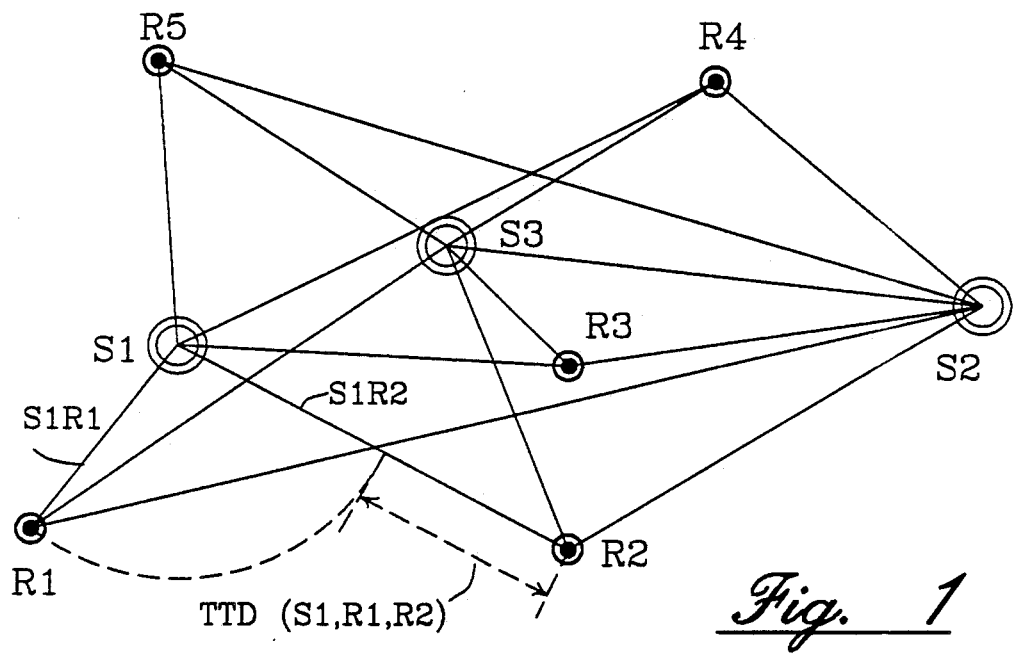
FIG. 1 is a plan view of an environment to be mapped showing 5 receivers and three acoustic sources.

FIG. 1 is a plan view of an environment to be mapped showing receivers R1 through R5 and acoustic sources S1 through S3. The environment is the three dimensional terrestrial or marine volume to be mapped surrounding the sources and receivers. Acoustic sources S1 through S3 may be natural sources of sound such as animals or may be artificial sound sources such as beepers. Such artificial sound sources may be positioned at random or known locations in the environment.

The mapping information to be determined from the environment according to the present invention may include:

a) survey information, that is, localization information for one or more sources S1 through S3, and receiver position information for receivers R1 through R5;

b) the sound speed field within the environment; and/or c) the wind or current field in the environment.

As will be discussed in more detail below, the present invention utilizes travel time differences, the difference in time required for sounds from a particular source to travel to a pair of receivers, to determine mapping information. Path S1R1 represents the straight line path that sound would travel from source S1 to receiver R1 in the absence of a wind or current field or varying sound speed field. Path S1R2 represents the path from source S1 to receiver R2. The travel time difference TTD for sounds from source S1 to receiver R1 and receiver R2 is proportional to the differences in the path lengths from source S1 to receivers R1 and R2 and is shown in FIG. 1 as TTD (S1,R1,R2).

Figure 2:
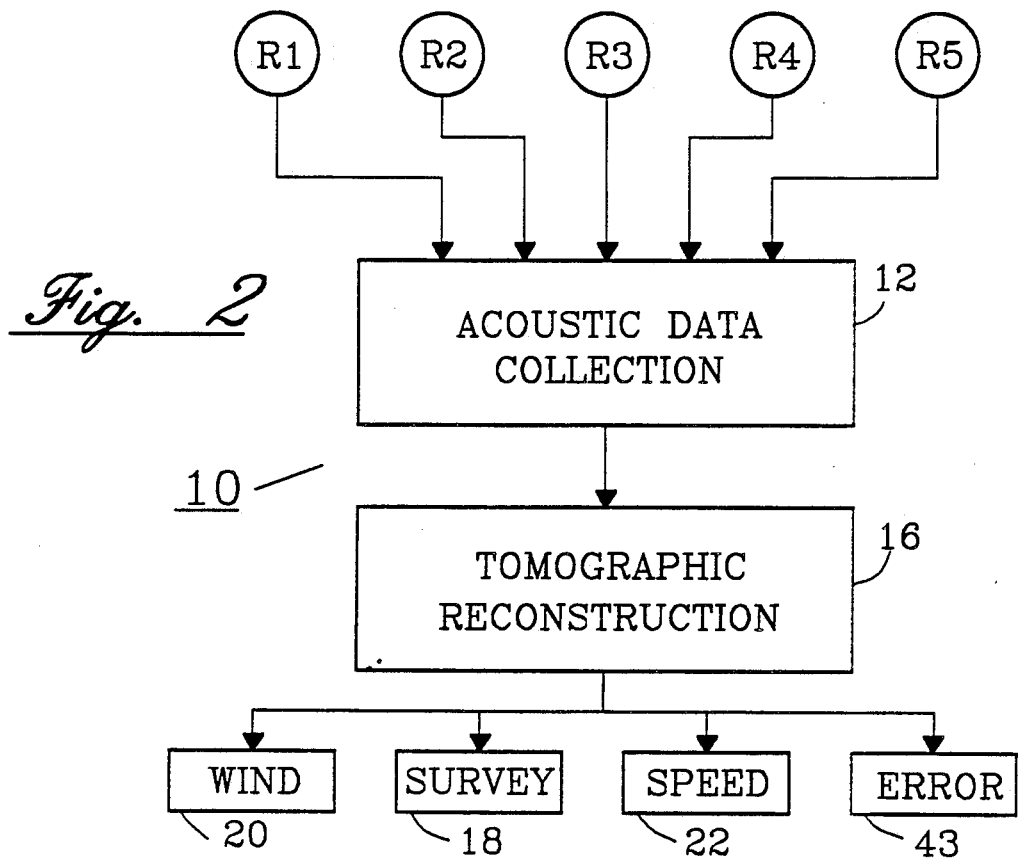
FIG. 2 shows a generalized block diagram of a system for processing acoustic data according to the present invention.

FIG. 2 shows a generalized block diagram of system 10 for processing acoustic data according to the present invention. The acoustic data is received by receivers R1 through R5 Which have been positioned in the environment to be mapped. A minimum of 5 receivers are needed by the present invention to resolve unknown source positions. Receivers R1 through R5 may be positioned almost randomly within the environment, but certain arrangements of receiver positions, such as five in a straight line, should be avoided to prevent degraded performance. If travel time is known for a particular application, the equations used in simultaneous equation solver 36 discussed below, can be modified to permit the use of only 4 receivers.

Receivers R1 through R5 are connected to acoustic data collection system 12. Acoustic data collection system 12 may consist of simple discrete cabling hard wired between receivers R1 through R5 and system 10 or, as will be discussed below, may conveniently provide wireless operation for particular applications. Wireless operation may easily be accomplished with one or more time tagged data tape recorders, a five channel tape recorder or even appropriate pairs of radio transmitters and receivers, not shown.

If the acoustic data collection system used does not use a consistent time base, the equations in Wiener filter solver 38, discussed below with reference to FIG. 3 can be modified to solve for time differences between recorders.

If the source or receivers are in relative motion to one another, the cross correlation step is preceded by Doppler corrections to estimate the relative velocity and to estimate the correction to the frequency shift observed at each receiver.

Depending upon the techniques used for data collection, acoustic data collection system 12 may include digital sampling (and/or analog to digital (A/D) converters) for the various channels of acoustic data collected by receivers R1 through R5.

After appropriate signal conditioning, the acoustic data is provided to tomographic reconstruction subsystem 16, described below in greater detail with respect to FIG. 3. Tomographic reconstruction subsystem 16 may conveniently provide the desired output in the form of various maps. The available maps include a survey map generated by survey map subsystem 18, a wind map generated by wind or current field mapping subsystem 20, a sound speed map generated by sound speed field mapping subsystem 22 and an error map generated by error field mapping subsystem 43.

The output of survey map subsystem 18 may be a complete three dimensional representation of the relative positions of the receivers, such as receivers R1 through R5, together with the localized positions of all sources, such as sources S1 through S3. It is convenient to select a relative coordinate reference system in which the position of a first receiver is at the origin, a second receiver's position is on the X axis with a Y value of zero, and a third receiver's position is at a predetermined value of the Z axis. In particular applications, the sources and or the receivers may be moved during the data collection sequence in order to provide more detailed survey information.

The absolute geographic location or the particular rotation of the coordinate frame in the environment in which the sources are located is not important for the purposes of this invention. Therefore some of the corrections of the reference positions of receivers R1 through R5 can be set to zero. The origin of the reference frame is located at receiver R1 by definition, so the variances of the x, y, and z components of its position are zero. The x-axis is defined so that receiver R1 is at x equal zero and receiver R2 has a y coordinate equal to zero and a defined z coordinate. The variances of the y and z components of the correction to receiver R2 are zero. This leaves one more parameter to determine: the rotation about the x axis. This is defined so that the z coordinate of receiver R3 is defined to be a given height from the x-y plane. Then, by definition the correction to the z position of receiver three is zero.

For example, in order to provide topological survey data for an area, fixed positioned receivers may utilize natural transmitters such as birds and animals whose positions vary during an extended data collection sequence. After sufficient time has elapsed, a survey map showing the receiver positions as a topological map may be generated.

In a variation of this approach, fixed positioned receivers may be used to determine a map of the positions of the sources. A survey map, using the receiver positions as a reference, could be generated to localize calling animals, that is, show a map of the positions of calling animals compared to the positions of the receivers.

In a variation of this approach, one or more sources may be in fixed positions or moved through the region to be mapped to determine the positions of moving receivers.

In another application, an intentionally moved artificial source may be used to provide a detailed surface map of a particular area. Using fixed positioned receivers, a single artificial source may be moved along the surface to be mapped. It may be moved in a random or fixed pattern such as a grid. The resultant survey map of the source positions provides a detailed map of the surface along which the source was moved.

In another application, the desired output may be a map of the wind in a terrestrial environment produced by wind or current field mapping subsystem 20. In a marine environment, the output of wind or current field mapping subsystem 20 would be a map of the current field in the environment.

In still another application, the desired output may be a map of the speed of sound field in the environment produced by speed field mapping subsystem 22. The speed of sound in the environment is a known function of the temperature and humidity of the medium the sounds propagated through, such as the air or the water. A speed field map is therefore a map related to the temperature field.

As is apparent from the various application described above, natural and artificial sources in fixed or moving positions may be used to produce maps of receiver and source positions as well as wind or current field maps and speed of sound or temperature field maps. These approaches and results may be combined in many different ways to suit the particular applications required. The maps may be improved in most instances by increasing the number of receivers and or sources.

When many sources broadcast at about the same time, there will be cross-correlation peaks which result from the correlations of signals from a single source and other, undesirable, peaks which result from the correlation of signals from more than one source. There are several convenient ways to identify which peaks are the peaks of interest which result from the correlations of signals from a single source.

If the different sources have bandwidths which do not overlap, the acoustic data may be filtered to allow only sources of interest. Alternately, the shape of the cross-correlation peak or of the power spectrum (e.g. its width) may distinguish a particular source. Further, the data may be processed to determine if the resultant model fits the data. If the wrong cross-correlation peak is chosen, the model may not fit the data since the data is non-physical.

In order to resolve position information ambiguities, a minimum of 5 receivers are required. The sources used may be natural or artificial but the time-bandwidth product, that is, the duration of the sound multiplied by the bandwidth of the sound or call is an important parameter. When the time bandwidth (a dimensionless quantity having units of Hertz seconds) of the acoustic call equals or exceeds 10, localization is possible even when the signal-to-noise ratio of the call at the receivers is less than one. The calls of many animals have time-bandwidth products which exceed 10.

The bandwidth of the sources is also an important parameter. The precision of the measured travel time differences, discussed below, improves with wider call bandwidths.

Figure 3:
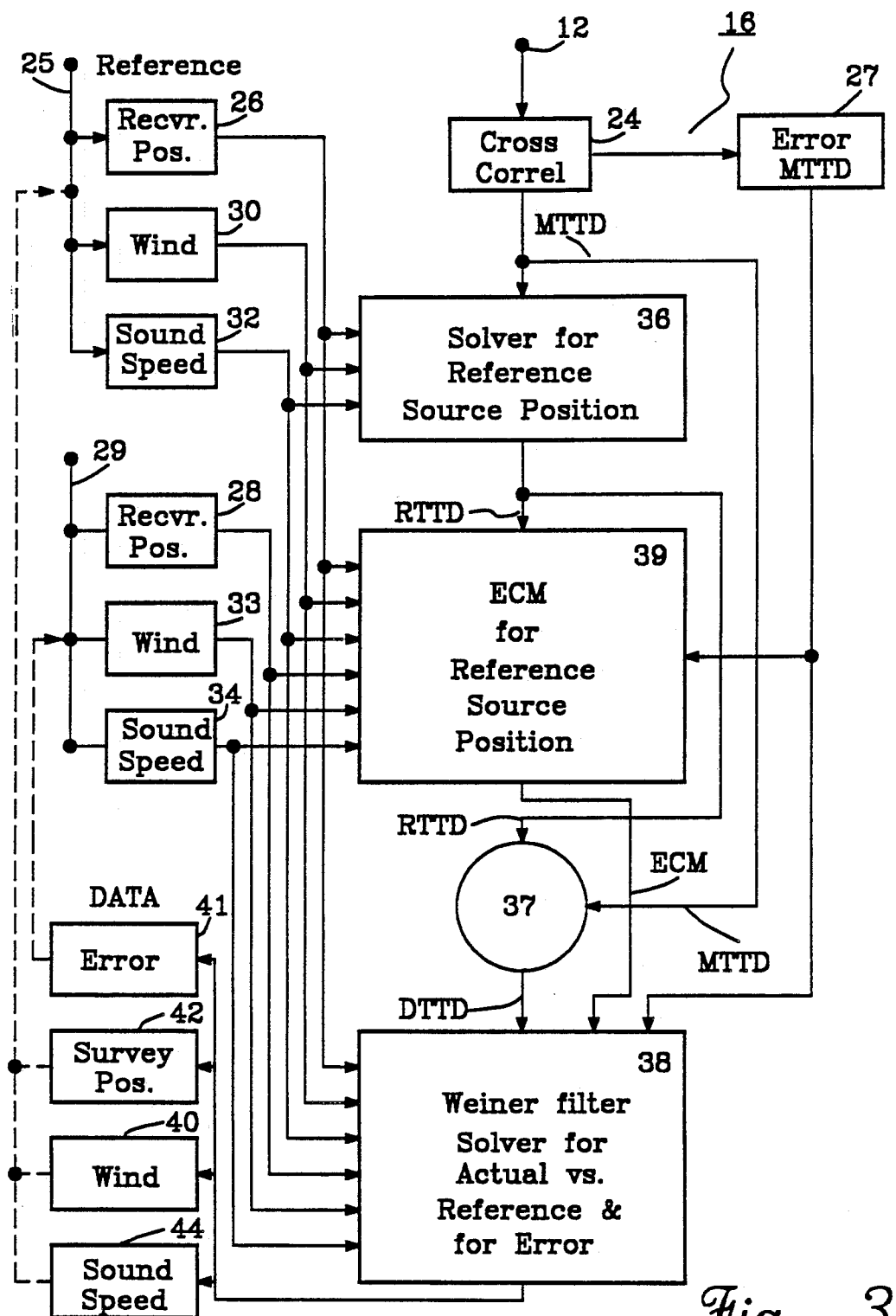
FIG. 3 is a block diagram of a system according to the present invention for the tomographic reconstruction of mapping data from acoustic data.

FIG. 3 is a block diagram of tomographic reconstruction subsystem 16 according to the present invention. Acoustic data input is applied, to cross correlator 24 from acoustic data collection system 12 shown in FIG. 2. Cross correlator 24 serves to determine the measured travel time difference MTTD, and the variance of the MTTD, shown as MTTD Error 27, from the acoustic data from two receivers by cross correlation of the acoustic data.

Various other known techniques for determining MTTD from the acoustic data may be used, such as envelope detection or maximum likelihood techniques, to determine the difference in travel time for the same sound to reach a pair of receivers. MTTD from cross correlator 24 is applied to simultaneous equation solver 36 as well as to subtracter 37, discussed below.

Operator supplied field data is applied via estimate input line 25. This field data includes operator estimated reference values for receiver position as well as wind and sound speed fields.

Operator supplied field data related to the errors in, or reliability of, the data applied to estimate input line 25 is itself applied to error estimate input line 29. This field data includes operator estimated values for the errors in the reference estimates for receiver position as well as wind and sound speed fields.

As discussed below with respect to FIG. 3, tomographic reconstruction subsystem 16 may be operated as a Kalman filter by connecting the appropriate outputs of Wiener filter solve 38, discussed below, to estimate input line 25 and error estimate input line 29 as shown by dotted lines.

Source position is normally not known. In certain applications, an artificial source may be positioned at an unknown or known position, such as a receiver position. The field data may simply be, for example, the information that source S1 is nearly co-located with receiver R1.

In some applications it may be desirable to position receivers in the environment even though their positions cannot be well estimated. An artificial sound source, such as a beeper not shown, may be positioned with one or more receivers during at least part of the data collection sequence to permit accurate determination of receiver positions. The field data may then include the estimate that the source position is not accurately known.

Operator supplied field data may, in some applications, be supplemented or replaced by measured field data from wind, temperature, or humidity sensors, not shown. The positions of individual sensors must also be estimated or, as noted above with respect to the beeper source, may be co-located with a receiver for convenience.

Appropriate portions of the field data from estimate input line 25 are applied to reference receiver position estimate register 26, reference wind field estimate 30, and reference sound speed field estimate register 32.

Appropriate portions of the field data from error estimate input line 29 are applied to receiver position error estimate register 28, wind field error estimate 33 and speed field error estimate register 34.

The outputs of estimate registers 26, 30, and 32 are applied as inputs together with MTTD to simultaneous equation solver 36.

Simultaneous equation solver 36, in response to these inputs, generates a reference travel time difference RTTD. Simultaneous equation solver 36 may easily be configured from conventional hardware and software. One particularly advantageous configuration of simultaneous equation solver 36 may be achieved by use of software implementing the well known least squares algorithm on a portable microcomputer.

The basic purpose of simultaneous equation solver 36 is to determine an estimate of the source positions based on the reference estimates applied to estimate input line 25. This is conveniently accomplished by solving the set of equations best describing the affect on MTTD of the known relationships with reference estimates of receiver position and wind and sound speed fields provided by estimate registers 26, 30, and 32. In some applications, simultaneous equation solver 36 may use the assumption that wind speed is zero and the speed of sound is constant, to reduce the required computation.

The primary outputs of simultaneous equation solver 36 are RTTD, the reference travel time differences for each pair of receivers. For $N_{rec}$ receivers, there are $N_{rec}-1$ independent MTTD for each source. RTTD represents the travel time differences that would have been experienced by sounds from the sources arriving at the receivers if the reference estimates for position and wind and speed fields were accurate.

RTTD is applied by simultaneous equation solver 36, together with the MTTD to subtracter 37 to produce the differential travel time difference DTTD. DTTD represents the difference in travel time differences resulting from the inaccuracy of the estimates discussed above.

RTTD is also applied by equation solver 36 to ECM generator 39. ECM generator 39 computes the error covariance matrix or ECM of the source positions in accordance with the reference receiver position and wind or sound speed estimates applied to estimate input line 25 and error estimate input line 29. ECM generator 39 then applies ECM to Wiener filter solver 38.

As noted above, Wiener filter solve 38 also receives DTTD from subtracter 37. Wiener filter solver 38 may conveniently be achieved by use of software implementing the well known Wiener filter algorithm on a portable microcomputer. The equations to be solved represent the relationship of the estimate errors to the DTTD. The output of Wiener filter solver 38 are wind data 40, survey data 42 and sound speed data 44 which are applied to wind or current field mapping subsystem 20, survey map subsystem 18 and speed field mapping subsystem 22 respectively, and error data 41 applied to error mapping subsystem 43, all as shown in FIGS. 2 and 3.

Tomographic reconstruction subsystem 16 operates to linearize the essentially nonlinear problem of determining source position data from travel time differences by determining RTTD based on reference estimates, determining the errors induced by the estimates and then correcting the estimates in accordance with the induced errors to determine the actual estimates. The remaining error of the mapping data, particularly survey data 42, is substantially less than the error present in the reference receiver position estimate register 26 and in the error of the reference source position given by ECM generator 39.

This remaining error may be further reduced by operation of tomographic reconstruction subsystem 16 as a Kalman filter. In particular, as shown in FIG. 3 by dotted connections, to achieve Kalman filtering, survey data 42, wind data 40 and sound speed data 44 may be applied to estimate input line 25 and error data 41 applied to error estimate input line 29. Iteration of tomographic reconstruction subsystem 16 with this feedback system reduces error by Kalman filtering.

In other words, tomographic reconstruction subsystem 16 essentially linearizes the non-linear source localization problem using reference estimates for the receiver positions, and using reference values for the sound speed and wind field. The reference source position is in error because of deviations from the reference values, and the ECM of the reference source position accounts for this. The reference quantities are used to compute RTTD, and DTTD is equal to MTTD - RTTD. DTTD has errors only due to the noise of MTTD. DTTD is the data used to solve for the deviations from the reference quantities using a Wiener filter or some other inverse technique. The error of the source position, after Wiener filtering, is smaller than the error of the reference source position because the errors in DTTD are less than those in ECM of the reference source position. Error maps of all quantities are available after Wiener filtering.

The following explanation describes the mathematical basis for the determinations made in tomographic reconstruction subsystem 16. This explanation has four parts. The first part describes the mathematics involved in determining the reference source position from MTTD. The second part describes the determination of ECM. The third part describes the calculation of RTTD and DTTD. The fourth part provides a mathematical model which may be used for tomographic reconstruction. All four parts refer to numbered equations which immediately follow the end of the explanation.

1. REFERENCE SOURCE POSITION

If the speed of sound is constant, the wind or current field in the environment is zero, and if the receiver positions are known without error, every measured travel-time difference MTTD of signals from a source constrains that source to the surface of a hyperboloid. The intersection of the hyperboloids from independent pairs of receivers determines the source position. With four receivers, the source is constrained to lie on the intersection of three hyperboloids which may intersect at two points. With five or more receivers, the intersections constrain the position to a single point. The position of a source may therefore be determined unambiguously from independent MTTD's determined from signals from that source received by five or more receivers. The mathematics for obtaining the unambiguous source position based on five or more receivers is described below.

A reference model is taken to have a sound speed $c_O$. Since there is no wind and since the sound speed is a constant, the acoustic paths are straight. The reference source position may then be denoted by equation 1 and the reference receiver positions by equation 2. Small boldface characters are used to denote vectors. As indicated by equation 3, there are therefore $N_r$ equations which describe the relation between MTTD and the locations of the source and the receivers.

As used in equation 3, MTTD is given by equation 4, T(i) is the travel time to receiver $r_i$ and $v_i$ is the error in the measurement. In equation 3, the modulus squared of a vector is $|x|^2$ which is the square of the length of the vector. As suggested by Watkins and Schevill (1971) discussed above, the first equation in equation 3 is subtracted from the remaining $N_r-1$ equations and receiver $r_i$ is placed at the origin of the coordinated system, that is, $r_o(1) - (0,0,0).$ The resulting equations are shown in equation 5 which is linear in the four unknowns shown in equation 6.

Equation 3 can be rewritten in matrix notation as shown in equation 7 where the i'th row of the matrix A is as shown in equation 8 and matrix A has $N_r-1$ rows. The i'th row of b is given by equation 9. It is important to note that with five or more receivers, a reference position for the source can be determined from equation 7 by solving linear equations.

The solution to equation 7 minimizes the sum of the squares of the residuals is given by equation 10 where the singular value decomposition of matrix A is as shown in equation 11 with the matrix S given by equations 12 and 13. $\bar{S}$ is a square non-singular diagonal submatrix of dimension k by k where the rank of A is k. The superscript T denotes the transpose operation. Further information is available from the book "Solving least squares problems" by C.L. Lawson and R.J. Hanson published by Prentice-Hall, Princeton, N.J. in 1974. See in particular chapters 4 and 7.

2. ERROR COVARIANCE MATRIX OF REFERENCE SOURCE POSITION

The uncertainty in the reference model can be estimated using standard linear error analysis. To first order, the noise component of $b_i$ given in equation 9 is shown in equation 14, where $\tau_i$ is considered to be a known number (the measured data) and $v_i$ is considered to be a random variable. The deviation from the reference model, $m_1$, is defined as shown in equation 15.

The error covariance matrix for $\delta m_1$ due to errors $v_i$ is shown in equation 16. The expected value of a random variable $v_i$ is $\bar{v_i}$. The error covariance matrix defines the uncertainty of the model estimate given by equation 15. The i-j'th element of $\overline{\delta b \delta b^i}$ is given in equation 17.

The covariance $\overline{v_i v_j}$ must include the effects of neglecting actual variations of the sound speed, winds, receiver position errors, for accurate determination of the error covariance matrix for the reference source position. A method for this calculation is given by equation 34 by setting the variance of the source uncertainty in equation 34 to zero.

3. DIFFERENTIAL TRAVEL TIME DIFFERENCES

The reference TTD, RTTD, are calculated as shown in equation 18 where the reference soundslowness SS is defined by equation 19. The differences between the measured and reference TTD is DTTD and is shown in equation 20.

4. TOMOGRAPHIC RECONSTRUCTIONS

The measured TTD may be modeled as shown in equation 21. The actual position of the source and receiver are as shown in equations 22 and 23, respectively. The increment of acoustic path length (direction) between the actual source position and receiver $r_i$ is denoted by $dl_i(dl_i)$. In general, the path is curved due to acoustic refraction. The actual SS field along path i is given by equation 24. The wind field along path i is $u(x_i)$. In equation 21, the unknown models are, 1. $\delta s$: the correction to the reference position of the source.
2. $\delta r(i)$: the correction to the reference position of receiver $r_i$.
3. $\delta n(x)$: the correction to the reference SS.
4. $u(x)$: the wind field.

The DTTD may be decomposed as shown in equation 25 where $\delta \tau_2$ is a linear function of the models and NL(i) is a nonlinear function of the models. The tomographic problem is linearized by neglecting the nonlinear constituent in the forward problem. The linear constituent is given by equation 26 in accordance with equation 27.

In equation 26, the incremental length (direction) along the straight line from the source to receiver $r_i$ is $d\zeta_i(d\zeta_i)$. The vector which points from the origin to points along the path from a source to receiver $r_i$ is $\zeta_i$. The linearized forward problem is given by equation 26 where the DTTD are used in place of the $\delta\tau_2(i)$. Equations 26 constitute the linear equations to solve in Wiener filter solver 38.

There are many techniques by which the models which fit the data can be constructed. The theory described here is one invented by Wiener, and the method bears his name: Wiener filtering. This technique is also known by the names of objective analysis (in oceanography) and by Kriging (in economics). Two of the many other inverse techniques which would provide useful results are parameter estimation schemes which ultimately rely on some least-squares solutions as discussed in the text by Lawson and Hanson referenced above and Kalman filters discussed in the article "Applications of sequential estimation to data assimilation, in Large-Scale Oceanographic Experiments in the World Climate Research Programme, by M. Ghil, and S.E. Cohn, CRP Publ. Ser., No. 1, Vol. II, WMO/ICSU, Geneva, Switzerland, pp. 341-356, 1983, which allow the data to be assimilated in numerical models of the atmosphere or the ocean.

The Wiener filter is a linear estimator of the model based upon the data. Suppose there are N data and that the data are placed into a vector, d. This is referred to as the data vector. In the present case, there are $N_s \times (N_r - 1)$ data. The data vector could also include measurements of the winds (currents) at certain locations, or measurements of the sound speed at certain locations. In any case, all the data is placed in the data vector and the data need not be of the same type or even have the same units.

Let the quantities to be estimated from the data be referred to as the models. Some choices for the models could be the wind (current) at a certain location, the sound speed at a certain location, or the correction to the reference locations of one of the sources or one of the receivers. Each of the models is written as a linear combination of the data as shown in equation 28 where the N unknown weights which multiply the data are in the weight vector $\alpha$. The weights are chosen so that the expected mean square error between the estimated model, $\hat{m}$ and the true model, m is a minimum.

In other words, the weight are chosen so that equation 29 is a minimum. The solution for $\alpha$ which minimizes Q is known as the minimum mean square error solution (MMSE) and is given by equation 30. The solution involves a symmetric square matrix, $\Gamma$, having N rows and N columns. The i-j'th element of this matrix is given by equation 31 where the i'th datum is $d_i$. This matrix is referred to as the data-data covariance matrix. Its construction relies upon being able to estimate the covariances between the different data.

The solution also involves the model-data vector, $\beta$, which has N rows. Its i'th row is given by equation 32. The variance of the model estimate is given by equation 33. The first term on the right hand side is the variance of the true model hereafter referred to as the a priori variance from error estimate input line 29 or ECM generator 39. The second term on the right hand side is the amount by which the a priori variance is reduced because of the information provided by the data.

With the data given by equation 26, the i-j'th element of the data-data covariance matrix is as shown in equation 34. The prime refers to the fact the source for datum j may not be the same as the source for datum i. The kroenecker delta function, $\delta_{ij}$ is one if i equals j and equals zero otherwise. This means that the noise components of data i and j are uncorrelated.

The covariances for the source corrections are obtained from the diagonal elements of the error covariance matrix of the reference position of the source as shown in equation 16. The covariances of the receiver corrections are obtained from surveys Which the investigator measures. In other words, an investigator places some receivers in certain spots and estimates their (x,y,z) positions and the errors of those positions.

A common way to specify the covariance function for the winds (currents) or SS field is to choose some covariance lengths, $L_x$, $L_y$, and $L_z$, which have the same scales as the shortest scales in those fields which contain a significant amount of energy. The covariance function can be obtained from some physically possible covariance function such as the Gaussian function shown in equation 35 for the SS field. Similar relations can be used for each component of the wind.

The variance of this function, $\sigma^2\delta_n$, is chosen to be the variance of the SS variations expected in the region. Similar expressions can be used for the winds.

The Wiener filter also requires evaluation of the model-data covariance vector $\beta$. We choose the models to be:

1. The corrections to the reference positions of the sources. If there are $N_s$ sources then there are $3N_s$ unknowns (three Cartesian coordinates for each source.)

2. The corrections to the reference positions of the receivers. For $N_r$ receivers there are $3(N_r - 1) - 3$ unknowns. The reference receiver is at the origin by definition and so the positions of the other receivers are relative to it. The other term equal to two comes from the definitions that the y and z components of receivers R2 and R3, respectively, are provided as defined quantities as discussed above.

3. The wind or current field at $N_u$ locations. Since each location requires the wind in all three directions, there will be $3N_u$ unknowns.

4. The SS field at $N_{ss}$ locations.

The total number of models will be as shown in equation 36. For each model, a model-data covariance vector needs to be computed.

While this invention has been described with reference to its presently preferred embodiment, its scope is not limited thereto. Rather, such scope is only limited in so far as defined by the following set of claims and includes all equivalents thereof.

EQUATIONS 1 THROUGH 36 FOLLOW $$s_0 = (s_{0x}, s_{0y}, s_{0z}) \tag{1}$$

$$r_0(i) = (r_{0x}(i), r_{0y}(i), r_{0z}(i)) \; i = 1, 2, \ldots, N_r \tag{2}$$

$$\| s_0 - r_0(i) \|^2 = c_0^2(T(1) + \tau_1(i))^2; \; i = 1, 2, \ldots, N_r \tag{3}$$

$$\tau_1(i) = T(i) - T(1) + v_i; \; i = 1, 2, 3, \ldots, N_r \tag{4}$$

$$2r_{0x}(i)s_{0x} + 2r_{0y}(i)s_{0y} + 2r_{0z}(i)s_{0z} + 2c_0^2\tau_1(i)T(1) = \tag{5}$$

$$-c_0^2\tau_1^2(i) + \| r_0(i) \|^2; \; i = 2, 3, 4, \ldots, N_r$$

-continued $$m = \begin{pmatrix} s_{0x} \\ s_{0y} \\ s_{0z} \\ T(1) \end{pmatrix} \quad (6)$$

$$Am = b \quad (7)$$

$$(2r_{0x}(i+1) \; 2r_{0y}(i+1) \; 2r_{0z}(i+1) \; 2c_0^2\tau_1(i+1)); \quad (8)$$

$$i = 1, 2, \ldots m \; N_r - 1$$

$$b_i = -c_0^2\tau_1^2(i+1) + \|r_0(i+1)\|^2; \; i = 1, 2, \ldots, N_r - 1 \quad (9)$$

$$m_1 = VS^*U^Tb \quad (10)$$

$$A = USV^T \quad (11)$$

$$S_{(N_r-1)\times 4} = \begin{pmatrix} \overline{S} \\ 0 \end{pmatrix} \quad (12)$$

$$S^*_{4\times(N_r-1)^*} = (\overline{S}^{-1} \; 0) \quad (13)$$

$$\delta b_i \simeq -2c_0^2\tau_1(i+1)v_i; \; i = 1, 2, \ldots, N_r - 1 \quad (14)$$

$$\delta m_1 = \begin{pmatrix} \delta s_{0x} \\ \delta s_{0y} \\ \delta s_{0z} \\ \delta T(1) \end{pmatrix} \quad (15)$$

$$C_0 \simeq \overline{\delta m_1 \delta m_1^T} = VS^*U^T\overline{\delta b \delta b^T}U(S^*)^TV^T \quad (16)$$

$$(\overline{\delta b \delta b^T})_{i,j} = 4c_0^4\tau_1(i+1)\tau_1(j+1)v_iv_j \quad (17)$$

$$\tau_0(i) = n_0\|s_0 - r_0(i)\| - n_0\|s_0 - r_0(1)\|; \; i = 2, 3, 4, \ldots, N_r \quad (18)$$

$$n_0 = 1/c_0 \quad (19)$$

$$\delta\tau(i) = \tau_1(i) - \tau_0(i); \; i = 2, 3, 4, \ldots, N_r \quad (20)$$

$$\tau_1(i) \int_{s_1}^{r_1(i)} [n_0 + \delta n(x_i)]dl_i - \quad (21)$$

$$\frac{1}{c_0^2}\int_{s_1}^{r_1(i)} u(x_i)odl_i - \int_{s_1}^{r_1(1)}[n_0 + \delta n(x_1)]dl_1 +$$

$$\frac{1}{c_0^2}\int_{s_1}^{r_1(1)} u(x_1)odl_1 + v_i; \; i = 2, 3, 4, \ldots, N_r$$

$$s_1 = s_0 + \delta s \quad (22)$$

$$r_1(i) = r_0(i) + \delta r(i); \; i = 1, 2, 3, \ldots, N_r \quad (23)$$

$$n_1(x_i) = n_0 + \delta n(x_i) \quad (24)$$

$$\delta\tau(i) = \delta\tau_2(i) + NL(i); \; i = 2, 3, 4, \ldots, N_r \quad (25)$$

$$\delta\tau_2(i) = n_0(F(i) - F(1)) + v_i - \frac{1}{c_0^2}\int_{s_0}^{r_0(i)} u(\xi_i)od\xi_i + \quad (26)$$

$$\frac{1}{c_0^2}\int_{s_0}^{r_0(1)} u(\xi_1)od\xi_1 + \int_{s_0}^{r_0(i)} \delta n(\xi_i)d\xi_i -$$

$$\int_{s_0}^{r_0(1)} \delta n(\xi_1)d\xi_1; \; i = 2, 3, 4, \ldots, N_r$$

$$F(i) = \frac{(r_{0x}(i) - s_{0x})(\delta r_x(i) - \delta s_x)}{\|r_0(i) - s_0\|} + \quad (27)$$

-continued $$\frac{(r_{0y}(i) - s_{0y})(\delta r_y(i) - \delta s_y)}{\|r_0(i) - s_0\|} + \frac{(r_{0z}(i) - s_{0z})(\delta r_z(i) - \delta s_z)}{\|r_0(i) - s_0\|};$$

$$i = 2, 3, 4, \ldots, N_r$$

$$\hat{m} = \alpha^T d \quad (28)$$

$$Q = \overline{(m - \hat{m})^2} \quad (29)$$

$$\alpha = \Gamma^{-1}\beta \quad (30)$$

$$\Gamma_{i,j} = \overline{d_id_j} \quad (31)$$

$$\beta_i = \overline{md_i} \quad (32)$$

$$Q_{min} = \overline{m^2} - \beta^T\Gamma^{-1}\beta \quad (33)$$

$$\overline{\delta\tau_2(i)\delta\tau_2(j)} = \Gamma_{i,j} = n_0^2\overline{(F(i) - F(1))(F(j) - F(1))} + \quad (34)$$

$$\frac{1}{c_0^4}\int_{s_0}^{r_0(i)}\int_{s_0'}^{r_0(j)} \overline{u(\xi_i)od\xi_iu(\xi_j)od\xi_j} -$$

$$\frac{1}{c_0^4}\int_{s_0}^{r_0(i)}\int_{s_0'}^{r_0(1)} \overline{u(\xi_i)od\xi_1'u(\xi_1')od\xi_1'} -$$

$$\frac{1}{c_0^4}\int_{s_0}^{r_0(1)}\int_{s_0'}^{r_0(j)} \overline{u(\xi_1)od\xi_1u(\xi_j)od\xi_j} +$$

$$\frac{1}{c_0^4}\int_{s_0}^{r_0(1)}\int_{s_0'}^{r_0(1)} \overline{u(\xi_1)od\xi_1u(\xi_1')od\xi_1'} +$$

$$\int_{s_0}^{r_0(i)}\int_{s_0'}^{r_0(j)} \overline{\delta n(\xi_i)\delta n(\xi_j)}d\xi_id\xi_j -$$

$$\int_{s_0}^{r_0(i)}\int_{s_0'}^{r_0(1)} \overline{\delta n(\xi_i)\delta n(\xi_1')}d\xi_id\xi_1' -$$

$$\int_{s_0}^{r_0(1)}\int_{s_0'}^{r_0(j)} \overline{\delta n(\xi_1)\delta n(\xi_j)}d\xi_1d\xi_j +$$

$$\int_{s_0}^{r_0(1)}\int_{s_0'}^{r_0(1)} \overline{\delta n(\xi_1)\delta n(\xi_1')}d\xi_1d\xi_1' + \overline{v_i^2}\delta_{ij}$$

$$\overline{\delta n(x_i, y_i, z_i)\delta n(x_j, y_j, z_j)} = \quad (35)$$

$$\sigma_{\delta n}^2 \exp(-(x_i - x_j)^2/L_x^2 - (y_i - y_j)^2/L_y^2 - (z_i - z_j)^2/L_z^2)$$

$$N_{models} = 3N_s + 3(N_r - 1) + 3N_u + N_{ss} - 3 \quad (36)$$

What is claimed is:

1. A method of determining mapping information comprising the steps of:
   acquiring acoustic data from at least five receivers in the environment to be mapped;
   determining travel time differences between receivers for the acoustic data;
   estimating error in the acoustic data;
   applying the estimates and the travel time differences to a model of the environment to be mapped; and
   extracting the mapping information.

2. The method of determining mapping information claimed in claim 1, wherein the model provides tomographic reconstruction of the environment from the acoustic data.

3. The method of determining mapping information claimed in claim 1, further comprising the steps of:
   applying error estimates to the model to localize approximate source positions;

determining reference travel time differences based upon the estimates;

determining differential travel time differences based on the difference between the reference travel time differences and measured travel time differences; and using the differential travel time differences to extract the desired mapping information.

4. The method of determining mapping information claimed in claim 1, wherein the step of determining travel time differences between receivers includes the step of:

cross correlating acoustic data received from each pair of receivers.

5. The method of determining mapping information claimed in claim 4 wherein the step of determining travel time differences between receivers includes the step of:

identifying signals from separate sources which broadcast acoustic data at about the same time.

6. The method of determining mapping information claimed in claim 5 wherein the signal identifying step further includes the step of:

filtering the cross correlation results to identify sources whose bandwidths do not overlap.

7. The method of determining mapping information claimed in claim 5 wherein the signal identifying step further includes the step of:

identifying sources in accordance with the shape of the cross-correlation peak.

8. The method of determining mapping information claimed in claim 5 wherein the signal identifying step further includes the step of:

identifying sources in accordance with the shape of the power spectrum.

9. The method of determining mapping information claimed in claim 5 wherein the signal identifying step further includes the step of:

identifying sources by processing the data to determine if the model fits the data.

10. The method of determining mapping information claimed in claim 1, wherein the extraction step produces mapping information related to localization of the sources and to errors in source position.

11. The method of determining mapping information claimed in claim 1, wherein the extraction step produces mapping information related to the position of the receivers and to errors in receiver position.

12. The method of determining mapping information claimed in claim 1, wherein the extraction step produces mapping information related to the wind field in the environment and errors in the wind field.

13. The method of determining mapping information claimed in claim 1, wherein the extraction step produces mapping information related to the speed of sound field in the environment and to errors in the sound speed field.

14. The method of determining mapping information claimed in claim 1, further including the step of:

positioning an acoustic data source in the environment.

15. The method of determining mapping information claimed in claim 14, wherein the data source positioning step further includes the step of:

positioning the source at a known reference location.

16. The method of determining mapping information claimed in claim 15, wherein the known reference source location is related to a receiver position.

17. A system for determining mapping information, comprising:

five receivers in the environment to be mapped;

an acoustic data acquisition system for receiving data from the receivers;

means for determining travel time differences between receivers for the acoustic data;

means for estimating error in the acoustic data; and a model of the environment to be mapped for receiving the estimates and the travel time differences and for extracting the mapping information.

18. The system claimed in claim 17, further comprising:

means for applying error estimates to the model to localize approximate source positions;

means for determining reference travel time differences based upon the estimates;

means for determining differential travel time differences based on the difference between the reference travel time differences and measured travel time differences.

19. The system claimed in claim 17 wherein the acoustic data acquisition system further comprises:

acoustic sources co-located with acoustic receivers for determining acoustic receiver position.

20. The system claimed in claim 17, wherein the means for determining travel time differences between receivers further comprises:

means for cross correlating acoustic data received from each pair of receivers.

21. The system claimed in claim 20 wherein the means for determining travel time differences between receivers further comprises:

means for identifying signals from separate sources which broadcast acoustic data at about the same time.

22. The system claimed in claim 21 wherein the means for identifying signals from separate sources includes:

means for filtering the cross correlation results to identify sources whose bandwidths do not overlap.

23. The system claimed in claim 21 wherein the means for identifying signals from separate sources includes:

means for identifying sources in accordance with the shape of the cross-correlation peak.

24. The system claimed in claim 21 wherein the means for identifying signals from separate sources includes:

means for identifying sources in accordance with the shape of the power spectrum.

25. The system claimed in claim 21 wherein the means for identifying signals from separate sources includes:

means for identifying sources by processing the data to determine if the model fits the data.

26. The system claimed in claim 17, further comprising:

an acoustic data source positioned in the environment.

27. The system claimed in claim 26, wherein the acoustic source is positioned at a known reference location.

28. The system claimed in claim 27, wherein the known reference source location is related to a receiver position.

* * * * *

UNITED STATES PATENT AND TRADEMARK OFFICE
CERTIFICATE OF CORRECTION

PATENT NO. : 4,995,011
DATED : Feb. 19, 1991
INVENTOR(S) : John L. Spiesberger

It is certified that error appears in the above-identified patent and that said Letters Patent is hereby corrected as shown below:

COL. 1    LINE 32    After "times" insert -- and/or positions of sources are not known --;

COL. 1    LINE 51    After "reference" delete --;-- ;

COL. 6    LINE 33    Correct -- "solver"--;

COL. 8    LINE 34    Correct -- $\overline{\delta b \delta b^T}$ --;

COL. 10    LINE 14    Correct -- which --;

COL. 11    LINE 22    Replace "$(N_r-1)^*$" with --$(N_r-1)$--;

COL. 11    LINE 31    Correct Equation (16) to read:

$$-- \quad C_0 \cong \overline{\delta m_1 \delta m_1^T} = VS^* U^T \overline{\delta b \delta b^T} U(S^*)^T V^T \qquad (16) \quad --;$$

UNITED STATES PATENT AND TRADEMARK OFFICE
CERTIFICATE OF CORRECTION

PATENT NO. : 4,995,011

DATED : February 19, 1991

INVENTOR(S) : John L. Spiesberger

It is certified that error appears in the above-identified patent and that said Letters Patent is hereby corrected as shown below:

COL. 11   LINE 32   Correct Equation (17) to read:

$$-- \quad \overline{(\delta b \delta b^T)}_{ij} = 4c_0^4 \tau_1(i+1)\tau_1(j+1)\overline{\nu_i \nu_j} \qquad (17) \quad --.$$

Signed and Sealed this

Twenty-ninth Day of September, 1992

*Attest:*

DOUGLAS B. COMER

*Attesting Officer*     *Acting Commissioner of Patents and Trademarks*